(12) United States Patent
Guo et al.

(10) Patent No.: US 10,178,409 B2
(45) Date of Patent: *Jan. 8, 2019

(54) METHOD AND APPARATUS FOR INTRA MODE CODING

(71) Applicant: HFI Innovation Inc., Zhubei (TW)

(72) Inventors: Mei Guo, San Jose, CA (US); Shan Liu, San Jose, CA (US); Shaw-Min Lei, Zhubei (TW)

(73) Assignee: HFI Innovation Inc., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,026

(22) Filed: Feb. 27, 2018

(65) Prior Publication Data
US 2018/0192073 A1    Jul. 5, 2018

Related U.S. Application Data

(60) Continuation of application No. 15/297,735, filed on Oct. 19, 2016, now Pat. No. 9,942,566, which is a
(Continued)

(51) Int. Cl.
*H04N 19/593* (2014.01)
*H04N 19/176* (2014.01)
(Continued)

(52) U.S. Cl.
CPC ........... *H04N 19/593* (2014.11); *H04N 19/11* (2014.11); *H04N 19/122* (2014.11);
(Continued)

(58) Field of Classification Search
CPC ...... H04N 19/61; H04N 19/33; H04N 19/593; H04N 19/176; H04B 19/11
See application file for complete search history.

(56) References Cited

U.S. PATENT DOCUMENTS 8,228,989 B2  7/2012  Kim et al.
8,311,120 B2  11/2012  Kaushik
(Continued)

FOREIGN PATENT DOCUMENTS

| CN | 101500161 A | 8/2009 |
|---|---|---|
| CN | 101653006 A | 2/2010 |
| KR | 20090104057 A | 5/2009 |

OTHER PUBLICATIONS

International Search Report and Written Opinion for Application No. PCT/CN2012/087887 dated Apr. 4, 2013.
(Continued)

*Primary Examiner* — Tat C Chio
(74) *Attorney, Agent, or Firm* — Wolf, Greenfield & Sacks, P.C.

(57) ABSTRACT

A method and apparatus of predictive Intra coding of a block are disclosed. In one embodiment according to the present invention, a set of Intra prediction modes is determined, and predictive Intra coding is applied to a prediction unit (PU) of an image based on one or more neighboring PUs according to a current Intra prediction mode. The current Intra prediction mode is selected from the set of Intra prediction modes and the current Intra prediction mode is predicted using most probable modes (MPMs) and remaining modes. A number of the remaining modes is kept as a power of 2. For example, the 32 remaining modes can be represented using 5-bit fixed length codes.

20 Claims, 8 Drawing Sheets

Related U.S. Application Data division of application No. 14/371,438, filed as application No. PCT/CN2012/087887 on Dec. 28, 2012, now Pat. No. 9,936,224, which is a continuation-in-part of application No. PCT/CN2012/070425, filed on Jan. 16, 2012.

(51) Int. Cl.
*H04N 19/11* (2014.01)
*H04N 19/33* (2014.01)
*H04N 19/61* (2014.01)
*H04N 19/122* (2014.01)

(52) U.S. Cl.
CPC ........... *H04N 19/176* (2014.11); *H04N 19/33* (2014.11); *H04N 19/61* (2014.11)

(56) References Cited

U.S. PATENT DOCUMENTS

| | | | |
|---|---|---|---|
| 9,936,224 | B2 | 4/2018 | Guo et al. |
| 9,942,566 | B2 | 4/2018 | Guo et al. |
| 2011/0317757 | A1 | 12/2011 | Coban et al. |
| 2013/0136175 | A1* | 5/2013 | Wang ............... H04N 19/176 375/240.12 |
| 2013/0170546 | A1* | 7/2013 | Kim ............... H04N 19/50 375/240.12 |
| 2015/0172719 | A1 | 6/2015 | Guo et al. |
| 2017/0078695 | A1* | 3/2017 | Guo ............... H04N 19/176 |

OTHER PUBLICATIONS

International Preliminary Report on Patentability for Application No. PCT/CN2012/087887 dated Jul. 22, 2014.

Bross et al., WD4 Working Draft 4 of High Efficiency Video Coding. Joint Collaborative Team on Video Coding (JCT-VC) of ITU-T SG16 WP3 and ISO/IEC JTC1/SC29/WG11. Jul. 2011;1-215.

JCTVC-G1103_d9. WD5:Working Draft 5 of High-Efficiency Video Coding. Joint Collaborative Team on Video Coding (JCT-VC) of ITU-T SG 16 WP3 and ISO/IEC JTC1/SC29/WG1 17th Meeting: Geneva, CH, Nov. 21-30, 2011. Sections 8-9.

JCTVC-H0435. Intra mode coding with fixed length binarization. Joint Collaborative Team on Video Coding (JCT-VC) of ITU-T SG16 WP3 and ISO/IEC JTC1/SC29/WG11 8th Meeting: San Jose. Jan. 21, 2012. Sections 1-2, abstract and figure 1.

Kumakura et al., Non-CE6.c Fixed length binarization of remaining intra prediction mode. Joint Collaborative Team on Video Coding (JCT-VC) of ITU-T SG16 WP3 and ISO/IEC JTC1/SC29/WG11. Feb. 2012;1-6.

Lai et al., Non CE6 Set Intra Mode Number to be 35 for Intra 4×4 PU. Joint Collaborative Team on Video Coding (JCT-VC) of ITU-T SG16 WP3 and ISO/IEC JTC1/SC29/WG11. Feb. 2012;1-3.

Lin et al., Modifications to intra-frame coding. Joint Collaborative Team on Video Coding (JCT-VC) of ITU-T SG16 WP3 and ISO/IEC JTC1/SC29/WG11. Nov. 2011;1-4.

Sugimoto et al., Summary of CE10 on Number of Intra Prediction Directions. Joint Collaborative Team on Video Coding (JCT-VC) of ITU-T SG16 WP3 and ISO/IEC JTC1/SC29/WG11. Jan. 2011;1-8.

Sullivan et al., The H.264AVC Advanced Video Coding Standard: Overview and Introduction to the Fidelity Range Extensions. Applications of Digital Image Processing XXVII. Dec. 2001;454-74.

Van Wallendael et al., Improved Intra Mode Signaling for HEVC. IEEE. 2011;2-6.

Wien et al., Intra Coding with Variable Block Size. ITU-Telecommunications Standardization Sector. Dec. 2001;1-12.

Zhang et al., Intra mode coding with fixed length binarization. Joint Collaborative Team on Video Coding (JCT-VC) of ITU-T SG16 WP3 and ISO/IEC JTC1/SC29/WG11. Nov. 2011;1-15.

Zhang et al., On Intra Mode Mapping. Joint Collaborative Team on Video Coding (JCT-VC) of ITU-T SG16 WP3 and ISO/IEC JTC1/SC29/WG11. Nov. 2011;1-3.

* cited by examiner

METHOD AND APPARATUS FOR INTRA MODE CODING

CROSS REFERENCE TO RELATED APPLICATIONS

This application is a continuation of U.S. patent application Ser. No. 15/297,735, filed Oct. 19, 2016, entitled "METHOD AND APPARATUS FOR INTRA MODE CODING," which is a division of U.S. patent application Ser. No. 14/371,438, filed Jul. 10, 2014, entitled "METHOD AND APPARATUS FOR INTRA MODE CODING," which is a national stage filing under 35 U.S.C. § 371 of International Patent Application No. PCT/CN2012/087887, filed Dec. 28, 2012, entitled "METHOD AND APPARATUS FOR INTRA MODE CODING," which is a continuation-in-part of International Patent Application No. PCT/CN2012/070425, filed Jan. 16, 2012, entitled "INTRA MODE CODING," each of which is hereby incorporated herein by reference in its entirety.

FIELD OF THE INVENTION

The present invention relates to video coding. In particular, the present invention relates to coding techniques associated with Intra prediction.

BACKGROUND AND RELATED ART

Intra prediction exploits spatial correlation within a picture or within a picture region. In order to improve coding efficiency, the High-Efficiency Video Coding (HEVC) standard being developed under the Joint Collaborative Team on Video Coding (JCT-VC) group of video coding experts from ITU-T Study Group exploits block-based spatial prediction extensively. In HEVC, multiple Intra prediction modes are used to exploit spatial features and the number of Intra prediction modes depends on the block size of a Prediction Unit (PU). In HEVC Test Model Version 5.0 (HM-5.0), the size of the PU for Intra coding can be 64×64, 32×32, 16×16, 8×8, or 4×4. A total of 18 Intra prediction modes (mode 0 to mode 17) are used for 4×4 PU while 35 Intra modes (mode 0 to mode 34) are used for 8×8, 16×16, 32×32 and 64×64 PU as shown in FIG. 1. The 35 Intra prediction modes include 33 directional prediction modes, one DC mode and one Planar mode as shown in FIG. 1. Each Intra prediction mode, except for Intra prediction modes 0 and 3, has an associated angle as shown in FIG. 2. In HM-5.0, the Intra mode coding first maps the Intra mode index (i.e., intraPredMode) to intraPredOrder as shown in Table 1. Then intraPredOrder is mapped to the angle parameter (i.e., intraPredAngle) as shown in Table 2.

TABLE 1

| | intraPredMode | | | | | | | | | |
|---|---|---|---|---|---|---|---|---|---|---|
| | 0 | 1 | 2 | 3 | 4 | 5 | 6 | 7 | 8 | 9 |
| intraPredOrder | — | — | — | — | 1 | 5 | 13 | 17 | 21 | 29 |
| | intraPredMode | | | | | | | | | |
| | 10 | 11 | 12 | 13 | 14 | 15 | 16 | 17 | 18 | 19 |
| intraPredOrder | 33 | 3 | 7 | 11 | 15 | 19 | 23 | 27 | 31 | 2 |
| | intraPredMode | | | | | | | | | |
| | 20 | 21 | 22 | 23 | 24 | 25 | 26 | 27 | 28 | 29 |
| intraPredOrder | 4 | 6 | 8 | 10 | 12 | 14 | 16 | 18 | 20 | 22 |
| | intraPredMode | | | | | | | | | |
| | 30 | 31 | 32 | 33 | 34 | | | | | |
| intraPredOrder | 24 | 26 | 28 | 30 | 32 | | | | | |

TABLE 2

| | intraPredOrder | | | | | | | | | |
|---|---|---|---|---|---|---|---|---|---|---|
| | 0 | 1 | 2 | 3 | 4 | 5 | 6 | 7 | 8 | 9 |
| intraPredAngle | — | −32 | −26 | −21 | −17 | −13 | −9 | −5 | −2 | — |
| | intraPredOrder | | | | | | | | | |
| | 10 | 11 | 12 | 13 | 14 | 15 | 16 | 17 | 18 | 19 | |
| intraPredAngle | 2 | 5 | 9 | 13 | 17 | 21 | 26 | 32 | −26 | −21 |
| | intraPredOrder | | | | | | | | | |
| | 20 | 21 | 22 | 23 | 24 | 25 | 26 | 27 | 28 | 29 |
| intraPredAngle | −17 | −13 | −9 | −5 | −2 | — | 2 | 5 | 9 | 13 |
| | intraPredOrder | | | | |
| | 30 | 31 | 32 | 33 | |
| intraPredAngle | 17 | 21 | 26 | 32 | |

An alternative to the Intra mode index of FIG. 1 is to label each mode with its respective physical directions. FIG. 3 illustrates an example of Intra mode labeling, where "h" refers to the horizontal direction and "v" refers to the vertical direction.

In HM-5.0, the Intra mode coding of luma component comprises two most probable modes (MPMs) and the remaining modes. The two most probable modes are derived for each PU from the Intra mode of the above PU and the Intra mode of the left PU. If intraPredMode of the current PU is equal to either of the most probable modes, a flag prev_intra_pred_flag is set to 1 to indicate that intraPredMode of the current PU matches one of the most probable modes and the index of the matched most probable mode is transmitted following the flag. If intraPredMode of the current PU doesn't match any of the most probable modes, prev_intra_pred_flag is set to 0 to indicate this case and rem_intra_luma_pred_mode is transmitted following the flag to signal the index of the remaining mode matching intraPredMode of the current PU. The binarization of rem_intra_luma_pred_mode in CABAC is shown in Table 3 for 4×4 PU and in Table 4 for 8×8, 16×16, 32×32, and 64×64 PUs.

TABLE 3

| Value of rem_intra_luma_pred_mode | Bin string |
|---|---|
| less than 16 | Fixed Length, 0000~1111 |

TABLE 4

| Value of rem_intra_luma_pred_mode | Bin string |
|---|---|
| less than 31 | Fixed Length, 00000~11110 |
| 31 | 111110 |
| 32 | 111111 |

For 8×8, 16×16, 32×32 and 64×64 PU, there are 33 remaining modes, i.e., 33 possible values of rem_intra_luma_pred_mode as shown in Table 4. This requires one additional bit for rem_intra_luma_pred_mode equal to 32 or 33 compared to other remaining modes. This causes the code length of rem_intra_luma_pred_mode to be non-uniform and additional operations may be necessary for the corresponding coding process. It is desirable to be able to use fixed length codes for all remaining Intra prediction modes.

BRIEF SUMMARY OF THE INVENTION

A method and apparatus of predictive Intra coding of a block are disclosed. In one embodiment according to the present invention, a set of Intra prediction modes is determined for applying predictive Intra coding to PUs. A current Intra prediction mode is selected from the set of Intra prediction modes and the current Intra prediction mode is predicted using most probable modes (MPMs) and remaining modes, wherein a number of the remaining modes is kept as a power of 2. For example, the number of the remaining modes is 32 and the remaining modes are represented using 5-bit fixed length codes.

DETAILED DESCRIPTION OF THE INVENTION

Figure 1:
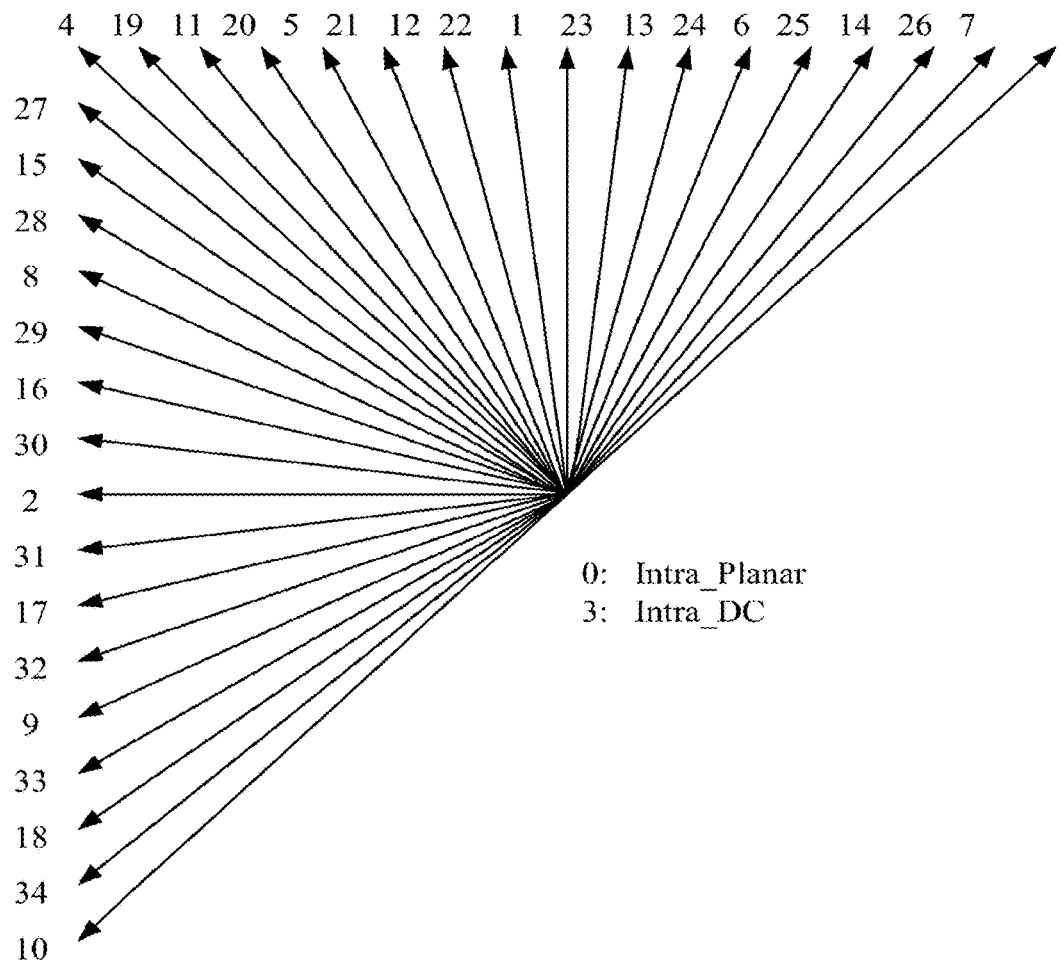
FIG. 1 illustrates the 35 Intra prediction modes for High-Efficiency Video Coding (HEVC) labeled with Intra mode indices.
Figure 2:
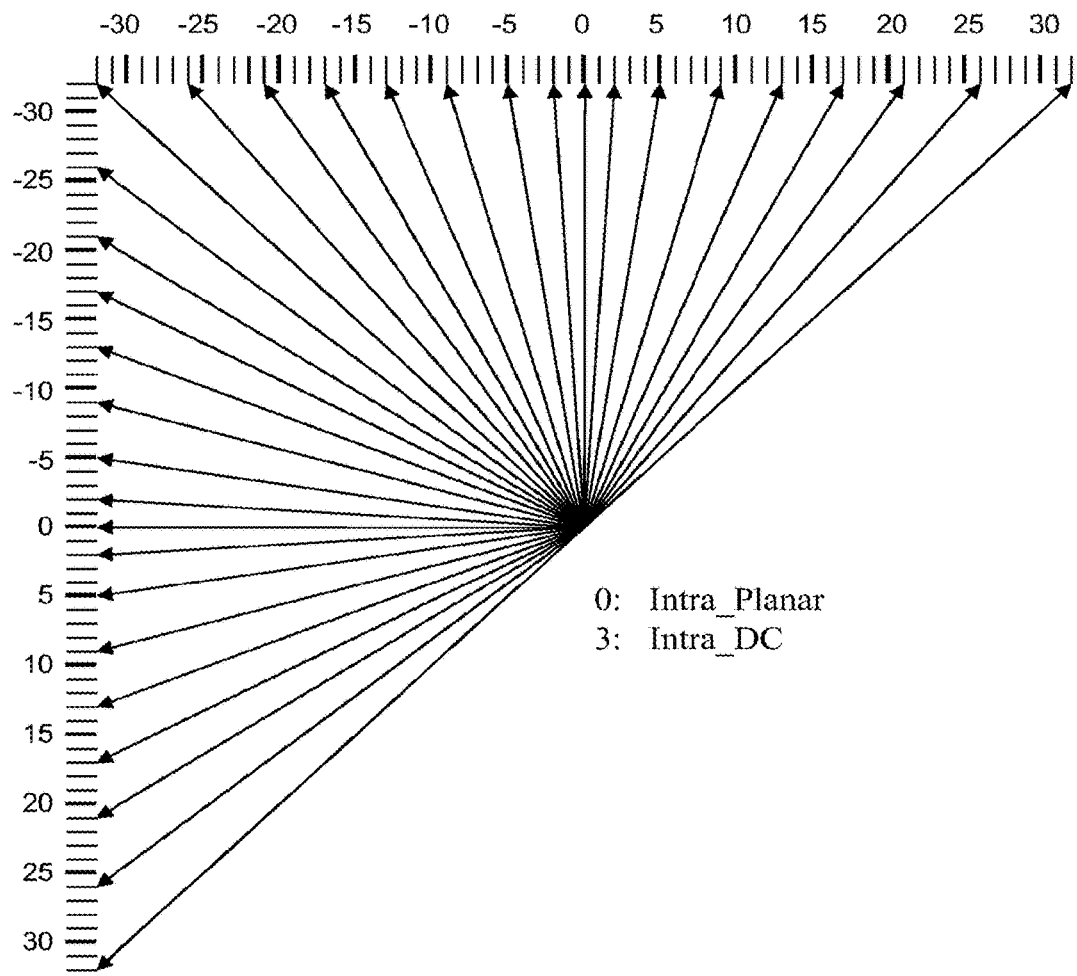
FIG. 2 illustrates the Intra prediction angles associated with Intra prediction modes for High-Efficiency Video Coding (HEVC).

As mentioned earlier, in HM-5.0, the 4×4 PU uses 18 Intra prediction modes and the 8×8, 16×16, 32×32 and 64×64 PUs use 35 Intra prediction modes. In other words, the 4×4 PU and larger PUs use different sets of Intra prediction modes. This situation is the same for other coding systems as well. For example, in H.264/AVC and RealVideo 8, the 4×4 block uses 9 Intra prediction modes while the 16×16 block uses 4 Intra prediction modes. In VP8, the 4×4 block uses 10 Intra prediction modes while the 16×16 block uses 4 Intra prediction modes. The use of different sets of Intra prediction modes between the 4×4 PU (or block) and other PUs (or blocks) will increase system complexity. Therefore, an embodiment of the present invention unifies the Intra prediction modes between the 4×4 PU and PUs having other block sizes. As an example, the 4×4 PU uses the same Intra prediction modes as 8×8, 16×16, 32×32 and 64×64 PUs. In this case, instead of 18 Intra prediction modes, the 4×4 PU may also use the set of 35 Intra prediction modes as the 8×8, 16×16, 32×32 and 64×64 PUs.

Figure 3:
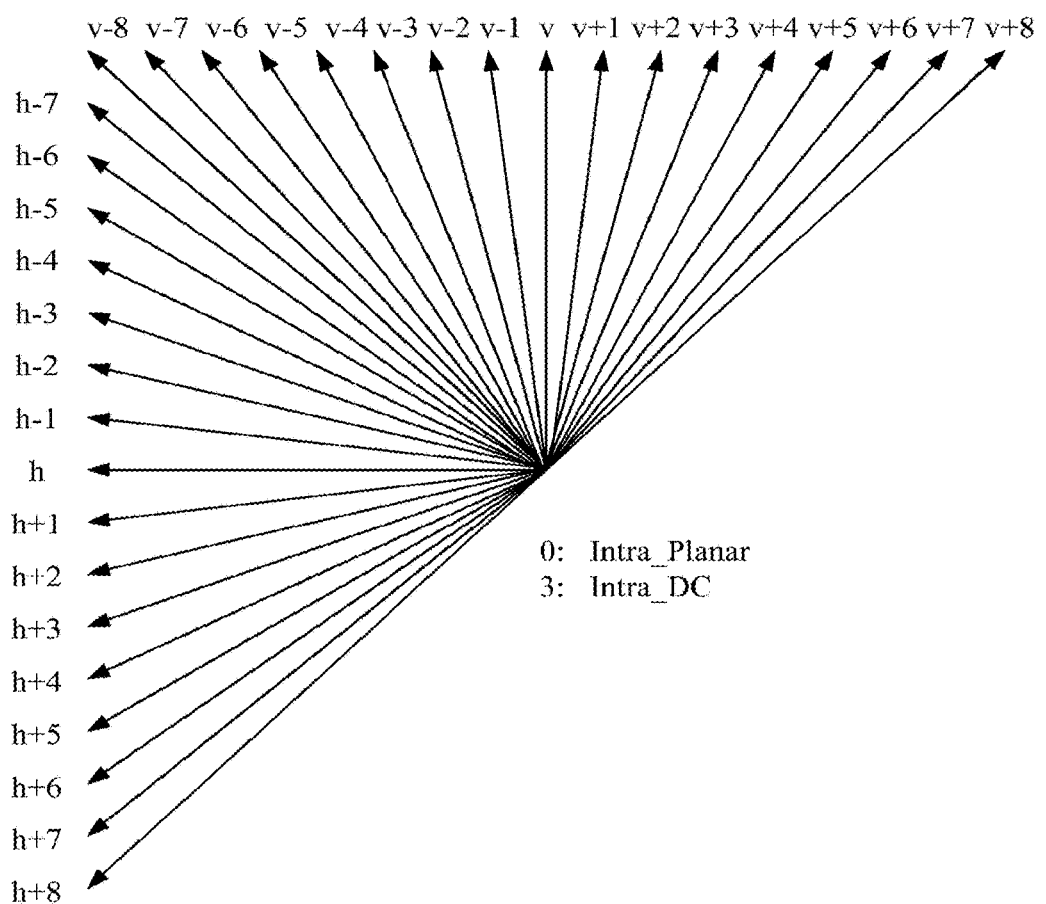
FIG. 3 illustrates the 35 Intra prediction modes for High-Efficiency Video Coding (HEVC) labeled with physical directions.
Figure 4A:
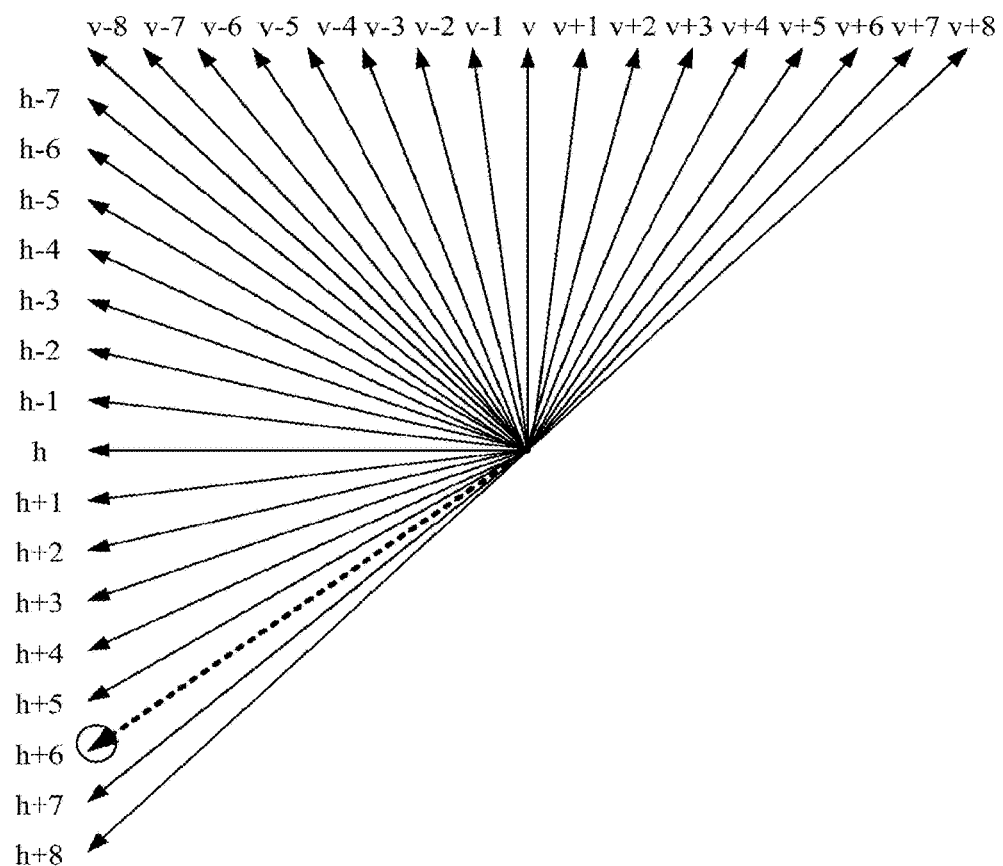
FIG. 4A illustrates an example of Intra prediction mode reduction by removing "h+6" Intra prediction mode (i.e., intraPredMode 18) according to an embodiment of the present invention.
Figure 4B:
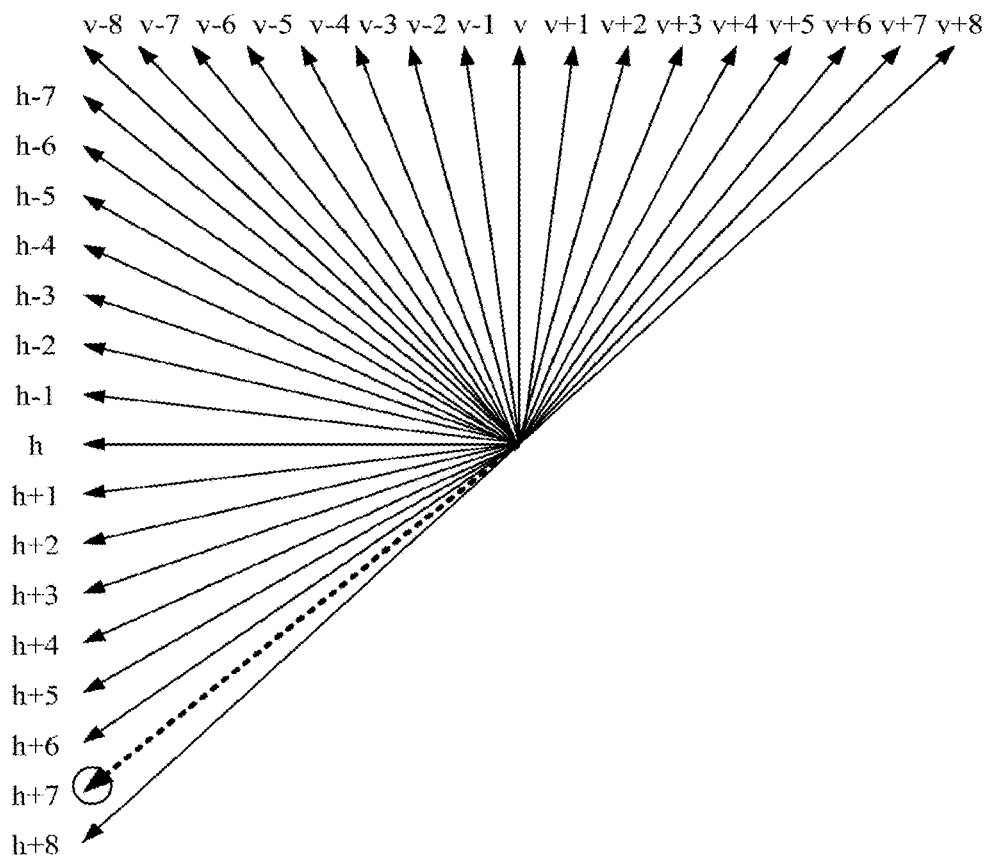
FIG. 4B illustrates another example of Intra prediction mode reduction by removing "h+7" Intra prediction mode (i.e., intraPredMode 34) according to an embodiment of the present invention.
Figure 4C:
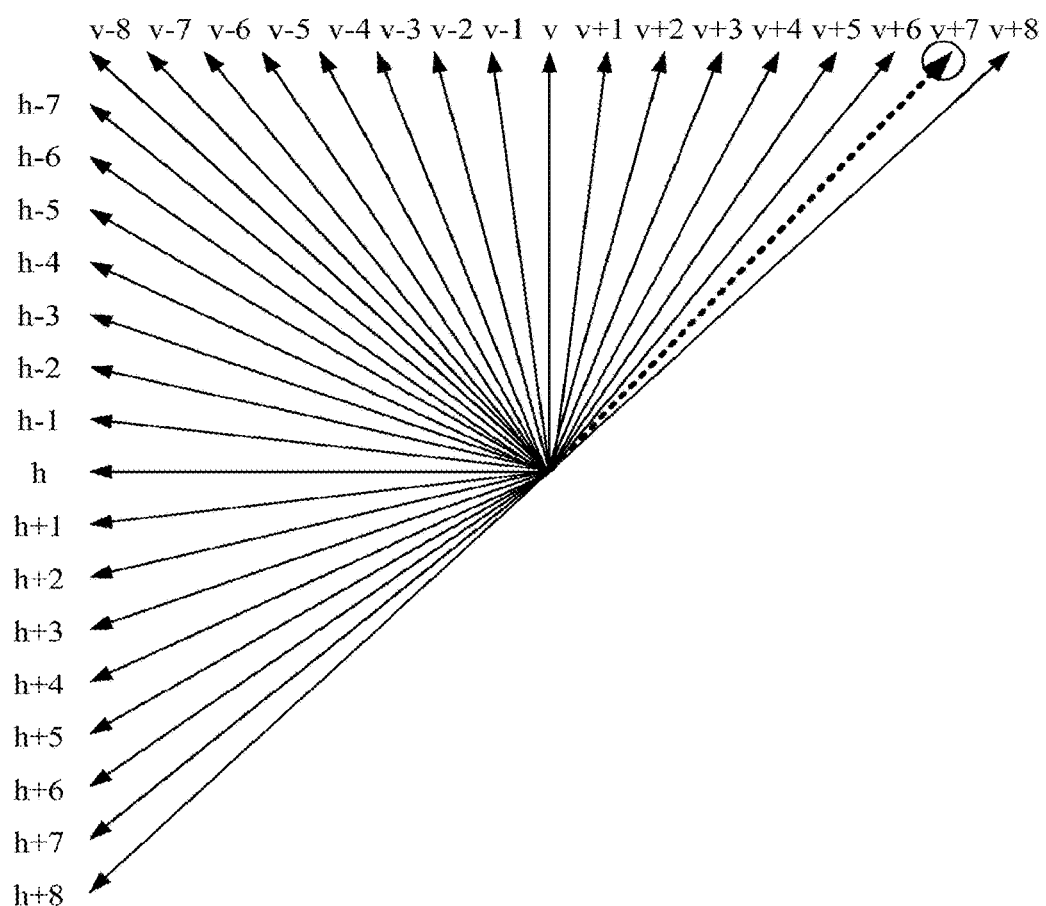
FIG. 4C illustrates another example of Intra prediction mode reduction by removing "v+7" Intra prediction mode (i.e., intraPredMode 26) according to an embodiment of the present invention.

In Intra mode coding, more Intra prediction modes will require more bits to represent a selected Intra prediction mode for a current Intra mode. It is desirable to reduce the number of Intra prediction modes with negligible performance impact. According to one embodiment of the present invention, the set of 35 Intra prediction modes is reduced to a set of 34 Intra prediction modes. By examining the 35 Intra prediction modes shown in FIG. 1 and FIG. 3, it is noticed that neither Intra prediction mode 18 (i.e., "h+6") nor Intra prediction mode 34 (i.e., "h+7") is included in the original set of 18 Intra prediction modes for the 4×4 PU. Therefore, either Intra prediction mode 18 (i.e., "h+6") or Intra prediction mode 34 (i.e., "h+7") can be removed from the set of 35 Intra prediction modes according to one embodiment.

Upon removal of an Intra prediction mode from the set of 35 Intra prediction modes, the mapping between the Intra mode indexes (i.e., intraPredMode) and intraPredOrder has to be modified accordingly and an example of modified mapping is shown in Table 5 (intraPredMode 18 removal) and Table 6 (intraPredMode 34 removal). Similarly, the mapping between intraPredOrder and the angle parameters (i.e., intraPredAngle) has to be modified as well and an example of the modified mapping is shown in Table 7 (intraPredMode 18 removal) and Table 8 (intraPredMode 34 removal). In HM-5.0, the current Intra prediction mode is coded using predictive coding based on the 2 most probable modes (MPMs) and remaining modes. When the 2 most probable modes are used, there will be 32 remaining modes after one Intra prediction mode is removed. The binarization of the 32 remaining modes for CABAC can be done using 5-bit fixed length codes as shown in Table 9. In tables 5 through 8, the "*" symbol indicates that there is no corresponding mapping element.

While the mapping between intraPredMode and intraPredOrder can be represent in a table form as shown in Tables 5 and 6, the mapping may also be represented in an ordered set form. For example, Table 5 can be represented by the ordered set{*, *, *, *, 1, 5, 13, 17, 21, 29, 32, 3, 7, 11, 15, 19, 23, 27, 2, 4, 6, 8, 10, 12, 14, 16, 18, 20, 22, 24, 26, 28, 30, 31}, wherein the first 4 ordered elements (i.e., "*,*,*,*") correspond to intraPredMode=0, 1, 2 and 3 respectively. The fifth ordered element (i.e., "1") correspond to intraPredMode=4, and so on. Similarly, Table 6 can be represented by the ordered set {*, *, *, *, 1, 5, 13, 17, 21, 29, 32, 3, 7, 11, 15, 19, 23, 27, 31, 2, 4, 6, 8, 10, 12, 14, 16, 18, 20, 22, 24, 26, 28, 30}.

The ordered set representation can also be applied to the mapping between intraPredOrder and intraPredAngle as shown in Tables 7 and 8. Accordingly, Table 7 can be represented by the ordered set {*, −32, −26, −21, −17, −13, −9, −5, −2, *, 2, 5, 9, 13, 17, 21, 26, 32, −26, −21, −17, −13, −9, −5, −2, *, 2, 5, 9, 13, 17, 26, 32} and Table 8 can be represented by the ordered set {*, −32, −26, −21, −17, −13, −9, −5, −2, *, 2, 5, 9, 13, 17, 21, 26, 32, −26, −21, −17, −13, −9, −5, −2, *, 2, 5, 9, 13, 17, 21, 32}.

TABLE 5

| | intraPredMode | | | | | | | | | |
|---|---|---|---|---|---|---|---|---|---|---|
| | 0 | 1 | 2 | 3 | 4 | 5 | 6 | 7 | 8 | 9 |
| intraPredOrder | * | * | * | * | 1 | 5 | 13 | 17 | 21 | 29 |

TABLE 5-continued

| | intraPredMode | | | | | | | | | |
|---|---|---|---|---|---|---|---|---|---|---|
| | 10 | 11 | 12 | 13 | 14 | 15 | 16 | 17 | 18 | 19 |
| intraPredOrder | 32 | 3 | 7 | 11 | 15 | 19 | 23 | 27 | 2 | 4 |
| | intraPredMode | | | | | | | | | |
| | 20 | 21 | 22 | 23 | 24 | 25 | 26 | 27 | 28 | 29 |
| intraPredOrder | 6 | 8 | 10 | 12 | 14 | 16 | 18 | 20 | 22 | 24 |
| | intraPredMode | | | | | | | | | |
| | 30 | | 31 | | 32 | | 33 | | | |
| intraPredOrder | 26 | | 28 | | 30 | | 31 | | | |

TABLE 6

| | intraPredMode | | | | | | | | | |
|---|---|---|---|---|---|---|---|---|---|---|
| | 0 | 1 | 2 | 3 | 4 | 5 | 6 | 7 | 8 | 9 |
| intraPredOrder | * | * | * | * | 1 | 5 | 13 | 17 | 21 | 29 |
| | intraPredMode | | | | | | | | | |
| | 10 | 11 | 12 | 13 | 14 | 15 | 16 | 17 | 18 | 19 |
| intraPredOrder | 32 | 3 | 7 | 11 | 15 | 19 | 23 | 27 | 31 | 2 |
| | intraPredMode | | | | | | | | | |
| | 20 | 21 | 22 | 23 | 24 | 25 | 26 | 27 | 28 | 29 |
| intraPredOrder | 4 | 6 | 8 | 10 | 12 | 14 | 16 | 18 | 20 | 22 |
| | intraPredMode | | | | | | | | | |
| | 30 | | 31 | | 32 | | 33 | | | |
| intraPredOrder | 24 | | 26 | | 28 | | 30 | | | |

TABLE 7

| | intraPredOrder | | | | | | | | | |
|---|---|---|---|---|---|---|---|---|---|---|
| | 0 | 1 | 2 | 3 | 4 | 5 | 6 | 7 | 8 | 9 |
| intraPredAngle | * | −32 | −26 | −21 | −17 | −13 | −9 | −5 | −2 | * |
| | intraPredOrder | | | | | | | | | |
| | 10 | 11 | 12 | 13 | 14 | 15 | 16 | 17 | 18 | 19 |
| intraPredAngle | 2 | 5 | 9 | 13 | 17 | 21 | 26 | 32 | −26 | −21 |
| | intraPredOrder | | | | | | | | | |
| | 20 | 21 | 22 | 23 | 24 | 25 | 26 | 27 | 28 | 29 |
| intraPredAngle | −17 | −13 | −9 | −5 | −2 | * | 2 | 5 | 9 | 13 |
| | intraPredOrder | | | | | | | | | |
| | 30 | | 31 | | 32 | | | | | |
| intraPredAngle | 17 | | 26 | | 32 | | | | | |

TABLE 8

| | intraPredOrder | | | | | | | | | |
|---|---|---|---|---|---|---|---|---|---|---|
| | 0 | 1 | 2 | 3 | 4 | 5 | 6 | 7 | 8 | 9 |
| intraPredAngle | * | −32 | −26 | −21 | −17 | −13 | −9 | −5 | −2 | * |

| | intraPredOrder | | | | | | | | | |
|---|---|---|---|---|---|---|---|---|---|---|
| | 10 | 11 | 12 | 13 | 14 | 15 | 16 | 17 | 18 | 19 |
| intraPredAngle | 2 | 5 | 9 | 13 | 17 | 21 | 26 | 32 | −26 | −21 |

| | intraPredOrder | | | | | | | | | |
|---|---|---|---|---|---|---|---|---|---|---|
| | 20 | 21 | 22 | 23 | 24 | 25 | 26 | 27 | 28 | 29 |
| intraPredAngle | −17 | −13 | −9 | −5 | −2 | * | 2 | 5 | 9 | 13 |

| | intraPredOrder | | |
|---|---|---|---|
| | 30 | 31 | 32 |
| intraPredAngle | 17 | 21 | 32 |

TABLE 9

| Value of rem_intra_luma_pred_mode | Bin string |
|---|---|
| less than 32 | Fixed Length, 00000~11110 |

While removal of Intra prediction mode 18 or 34 is used in the above examples as a means to reduce the number of Intra prediction modes, other Intra prediction mode may be selected for removal as well. For example, Intra prediction mode 26 can be removed and an example of modified mapping between the Intra mode indexes (i.e., intraPredMode) and intraPredOrder is shown in Table 10 and an example of modified mapping between the intraPredOrder and the angle parameters (i.e., intraPredAngle) is shown in Table 11.

TABLE 10

| | intraPredMode | | | | | | | | | |
|---|---|---|---|---|---|---|---|---|---|---|
| | 0 | 1 | 2 | 3 | 4 | 5 | 6 | 7 | 8 | 9 |
| intraPredOrder | * | * | * | * | 1 | 5 | 13 | 16 | 20 | 28 |

TABLE 10-continued

| | intraPredMode | | | | | | | | | |
|---|---|---|---|---|---|---|---|---|---|---|
| | 10 | 11 | 12 | 13 | 14 | 15 | 16 | 17 | 18 | 19 |
| intraPredOrder | 32 | 3 | 7 | 11 | 15 | 18 | 22 | 26 | 30 | 2 |

| | intraPredMode | | | | | | | | | |
|---|---|---|---|---|---|---|---|---|---|---|
| | 20 | 21 | 22 | 23 | 24 | 25 | 26 | 27 | 28 | 29 |
| intraPredOrder | 4 | 6 | 8 | 10 | 12 | 14 | 17 | 19 | 21 | 23 |

| | intraPredMode | | | |
|---|---|---|---|---|
| | 30 | 31 | 32 | 33 |
| intraPredOrder | 25 | 27 | 29 | 31 |

TABLE 11

| | intraPredOrder | | | | | | | | | |
|---|---|---|---|---|---|---|---|---|---|---|
| | 0 | 1 | 2 | 3 | 4 | 5 | 6 | 7 | 8 | 9 |
| intraPredAngle | * | −32 | −26 | −21 | −17 | −13 | −9 | −5 | −2 | * |

| | intraPredOrder | | | | | | | | | |
|---|---|---|---|---|---|---|---|---|---|---|
| | 10 | 11 | 12 | 13 | 14 | 15 | 16 | 17 | 18 | 19 |
| intraPredAngle | 2 | 5 | 9 | 13 | 17 | 21 | 32 | −26 | −21 | −17 |

| | intraPredOrder | | | | | | | | | |
|---|---|---|---|---|---|---|---|---|---|---|
| | 20 | 21 | 22 | 23 | 24 | 25 | 26 | 27 | 28 | 29 |
| intraPredAngle | −13 | −9 | −5 | −2 | * | 2 | 5 | 9 | 13 | 17 |

TABLE 11-continued

| | intraPredOrder | | |
|---|---|---|---|
| | 30 | 31 | 32 |
| intraPredAngle | 21 | 26 | 32 |

The ordered set representation for Table 10 is {*, *, *, *, 1, 5, 13, 16, 20, 28, 32, 3, 7, 11, 15, 18, 22, 26, 30, 2, 4, 6, 8, 10, 12, 14, 17, 19, 21, 23, 25, 27, 29, 31} and the ordered set representation for Table 11 is {*, −32, −26, −21, −17, −13, −9, −5, −2, *, 2, 5, 9, 13, 17, 21, 32, −26, −21, −17, −13, −9, −5, −2, *, 2, 5, 9, 13, 17, 21, 26, 32}.

The above embodiments of reducing intra prediction modes are just some examples. The other intra prediction modes can also be removed to solve the problem. By using this method, the remaining modes can be kept as the power of 2, so that a fixed length binarization can be used. For example, 5-bit fix length binarization can be used for the 32 remaining modes.

The performance of a coding system incorporating an embodiment of the present invention is compared with a reference system based on HEVC system without reduced number of Intra prediction modes. The performance is measured in terms of BD rate, where a negative value implies performance improvement over the reference system. The BD rate comparison is performed by adjusting coding parameters so that the underlying systems result in about the same objective quality. The performance results are shown in Table 12 for the case where Intra prediction mode 18 (i.e., "h+6") is removed. In Table 12, HE refers to High Efficiency coding configuration. Classes A through E refer to different sets of test video. As shown in Table 12, the impact on performance in terms of BD rate for Y, U and V components is very small. The performance results are shown in Table 13 for the case where Intra prediction mode 34 (i.e., "h+7") is removed. Again, the impact on performance is very small.

TABLE 12

| | All Intra HE | | |
|---|---|---|---|
| | Y | U | V |
| Class A | 0.13% | 0.12% | 0.12% |
| Class B | 0.01% | 0.04% | 0.01% |
| Class C | 0.04% | 0.05% | 0.05% |
| Class D | 0.03% | 0.04% | −0.02% |
| Class E | 0.04% | 0.03% | 0.03% |
| Overall | 0.05% | 0.06% | 0.04% |
| Enc Time [%] | | 100% | |
| Dec Time [%] | | 100% | |

TABLE 13

| | All Intra HE | | |
|---|---|---|---|
| | Y | U | V |
| Class A | 0.04% | 0.01% | 0.03% |
| Class B | 0.01% | 0.00% | 0.02% |
| Class C | 0.03% | 0.02% | 0.01% |
| Class D | 0.01% | 0.02% | 0.01% |
| Class E | 0.02% | 0.15% | 0.04% |
| Overall | 0.02% | 0.03% | 0.02% |
| Enc Time [%] | | 100% | |
| Dec Time [%] | | 100% | |

Figure 5:
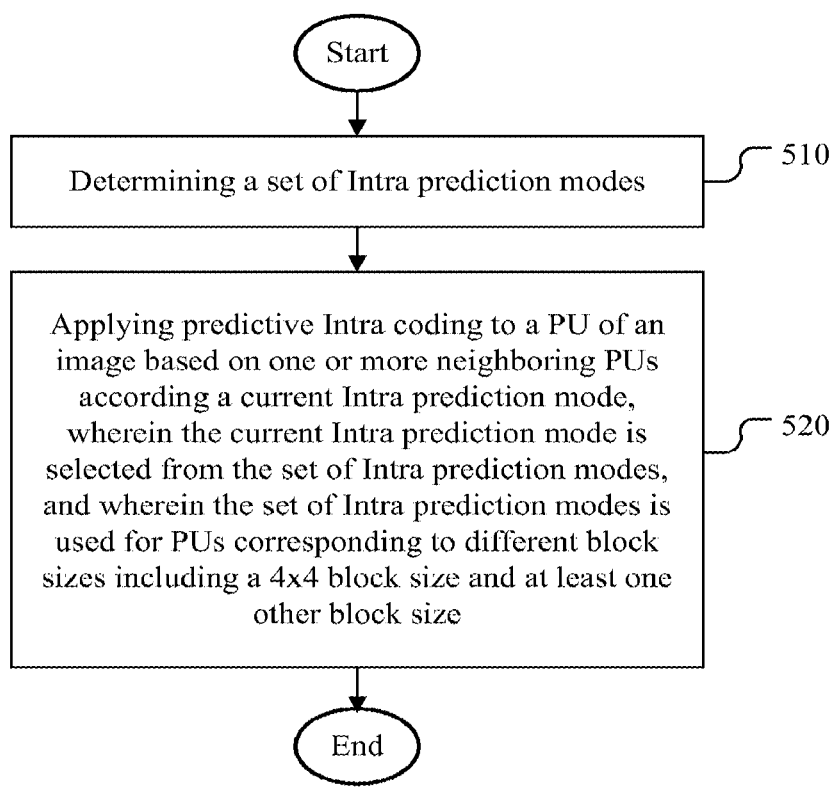
FIG. 5 illustrates an exemplary flowchart for a system sharing Intra prediction modes between 4×4 PUs and PUs of other block sizes according to an embodiment of the present invention.

When a system adopts a unified set of Intra prediction modes for the 4×4 PU and PUs of other sizes, both the encoder side and the decoder side will use this unified set. FIG. 5 illustrates an exemplary flowchart of a coding system that shares the same set of Intra prediction modes between 4×4 PUs and PUs having other block sizes. A set of Intra prediction modes is determined in step 510. For a video encoder, the set of Intra prediction modes may be determined according to a pre-defined set. For example, the set with 35 Intra prediction modes as defined in HM-5.0 may be used. For a video decoder, the set of Intra prediction modes may also be determined according to a pre-defined set. Alternatively, a video encoder may use a set of Intra prediction modes of its own and convey the information in the bitstream. In this case, the decoder can determine the set of Intra prediction modes from the received bitstream. The predictive Intra coding is then applied to a PU of an image based on one or more neighboring PUs according to a current Intra prediction mode as shown in step 520, wherein the current Intra prediction mode is selected from the set of Intra prediction modes, and wherein the set of Intra prediction modes is used for PUs corresponding to different block sizes including a 4×4 block size and at least one other block size. The predictive Intra coding may correspond to predictive Intra encoding for a video encoder or predictive Intra decoding for a video decoder. For a video encoder, the current Intra prediction mode may be selected according to a performance criterion, such as minimal RD rate. The current Intra prediction mode may be selected in a predictive fashion. Information related to the current Intra prediction mode may have to be incorporated in the bitstream so that a decoder may derive the same information. For a video decoder, the current Intra prediction mode may be derived from the bitstream or inferred from coding conditions.

Figure 6:
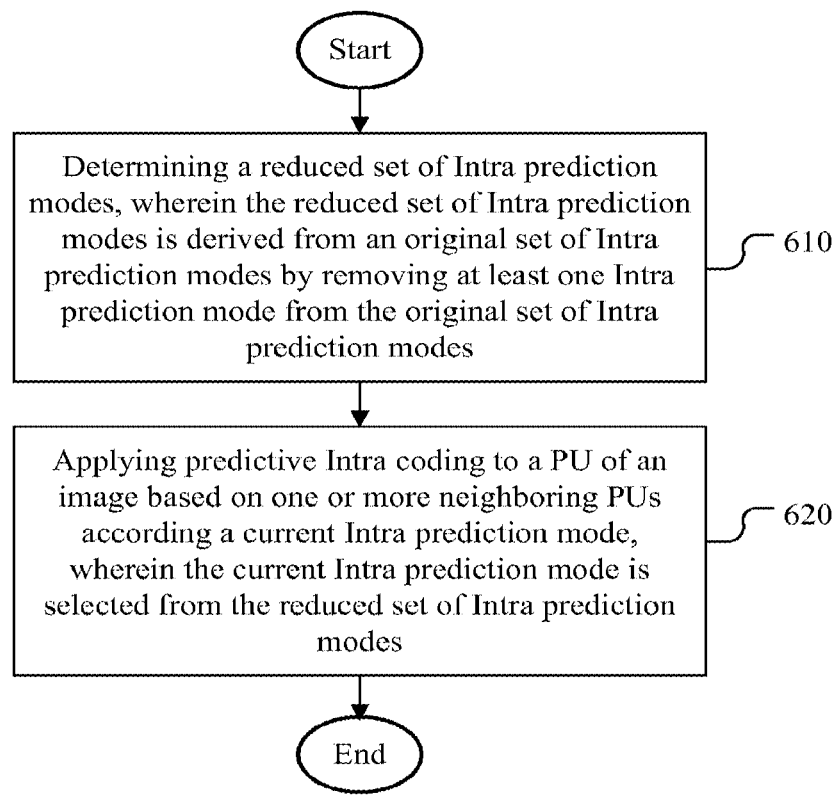
FIG. 6 illustrates an exemplary flowchart for a system incorporating a reduced set of Intra prediction modes according to an embodiment of the present invention.

When a system uses a set of reduced number of Intra prediction modes, the reduced set will be used in the encoder as well as the decoder so that the system can operate properly. FIG. 6 illustrates an exemplary flowchart for a coding system that uses a reduced set of Intra prediction modes. A reduced set of Intra prediction modes is determined in step 610, wherein the reduced set of Intra prediction modes is derived from an original set of Intra prediction modes by removing at least one Intra prediction mode from the original set of Intra prediction modes. At a video encoder side, the encoder may determine the reduced set according to one pre-defined set. The encoder may also select a reduced set of its own. The information regarding the reduced set may have to be incorporated in the bitstream so that a decoder may derive the same information. The predictive Intra coding is then applied to a PU of an image based on one or more neighboring PUs according a current Intra prediction mode as shown in step 620, wherein the current Intra prediction mode is selected from the reduced set of Intra prediction modes. Again, for a video encoder, the current Intra prediction mode may be selected according to a performance criterion, such as minimal RD rate. The current Intra prediction mode may be selected in a predictive fashion. Information related to the current Intra prediction mode may have to be incorporated in the bitstream so that a decoder may derive the same information. For a video decoder, the current Intra prediction mode may be derived from the bitstream or inferred from coding conditions.

The flowcharts shown in FIG. 5 and FIG. 6 are intended for serving as examples of sharing a set of Intra prediction modes and using a reduced set of Intra prediction modes according to embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A method for predictive Intra coding of a block, the method comprising:
    determining a set of Intra prediction modes for a predictive unit (PU) block of an image comprising at least two most probable modes (MPMs) and a plurality of remaining modes such that a number of remaining modes in the plurality of remaining modes is kept equal to a power of 2; and
    applying predictive Intra coding to the PU block based on one or more neighboring PU blocks according to a current Intra prediction mode selected from the set of Intra prediction modes.

2. The method of claim 1, wherein the plurality of remaining modes are represented using fixed length binarization.

3. The method of claim 1, wherein the plurality of remaining modes consists of 32 remaining modes.

4. The method of claim 3, wherein the 32 remaining modes are represented using 5-bit fixed length codes.

5. The method of claim 1, wherein the set of Intra prediction modes is used for PU blocks with a plurality of different block sizes including a 4×4 block size and at least one other block size.

6. The method of claim 5, wherein the at least one other block size includes at least one member selected from the group consisting of: an 8×8 block size, a 16×16 block size, a 32×32 block size, and a 64×64 block size.

7. The method of claim 1, wherein the set of Intra prediction modes contains 35 Intra prediction modes.

8. The method of claim 1, wherein the set of Intra prediction modes is used for PU blocks of all block sizes.

9. An apparatus for predictive Intra coding of a block, the apparatus comprising one or more electronic circuits configured for:
    determining a set of Intra prediction modes for a predictive unit (PU) block of an image comprising at least two most probable modes (MPMs) and a plurality of remaining modes such that a number of remaining modes in the plurality of remaining modes is kept equal to a power of 2; and
    applying predictive Intra coding to the PU block based on one or more neighboring PU blocks according to a current Intra prediction mode.

10. The apparatus of claim 9, wherein the plurality of remaining modes are represented using fixed length binarization.

11. The apparatus of claim 9, wherein the plurality of remaining modes consists of 32 remaining modes.

12. The apparatus of claim 11, wherein the 32 remaining modes are represented using 5-bit fixed length codes.

13. The apparatus of claim 9, wherein the set of Intra prediction modes is used for PU blocks with a plurality of different block sizes including a 4×4 block size and at least one other block size.

14. The apparatus of claim 13, wherein the at least one other block size includes at least one member selected from the group consisting of: an 8×8 block size, a 16×16 block size, a 32×32 block size, and a 64×64 block size.

15. The apparatus of claim 9, wherein the set of Intra prediction modes contains 35 Intra prediction modes.

16. The apparatus of claim 9, wherein the set of Intra prediction modes is used for PU blocks of all block sizes.

17. The apparatus of claim 1, wherein determining the set of Intra prediction modes for the PU block comprises:
    identifying 35 Intra prediction modes; and
    removing at least one Intra prediction mode from the identified 35 Intra prediction modes to form the set of Intra prediction modes for the PU block.

18. A non-transitory computer readable medium storing a computer-executable program, the computer-executable program, when executed, causing a decoder to perform the following steps:
    determining a set of Intra prediction modes for a predictive unit (PU) block of an image comprising at least two most probable modes (MPMs) and a plurality of remaining modes such that a number of remaining modes in the plurality of remaining modes is kept equal to a power of 2; and applying predictive Intra coding to the PU block based on one or more neighboring PU blocks according to a current Intra prediction mode selected from the set of Intra prediction modes.

19. A method for predictive Intra coding of a block, the method comprising:

determining a set of Intra prediction modes for a predictive unit (PU) block of an image comprising at least one most probable mode (MPM) and a plurality of remaining modes, wherein a number of remaining modes in the plurality of remaining modes is kept equal to 32; and applying predictive Intra coding to the PU block based on one or more neighboring PU blocks according to a current Intra prediction mode selected from the set of Intra prediction modes.

20. An apparatus for predictive Intra coding of a block, the apparatus comprising one or more electronic circuits configured for:

determining a set of Intra prediction modes for a predictive unit (PU) block of an image comprising at least one most probable mode (MPM) and a plurality of remaining modes, wherein a number of remaining modes in the plurality of remaining modes is kept equal to 32; and applying predictive Intra coding to the PU block based on one or more neighboring PU blocks according to a current Intra prediction mode selected from the set of Intra prediction modes.

* * * * *